(12) United States Patent
Maeda

(10) Patent No.: US 6,199,389 B1
(45) Date of Patent: Mar. 13, 2001

(54) AIR CONDITIONING SYSTEM AND METHOD FOR OPERATING THE SAME

(75) Inventor: Kensaku Maeda, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/402,647
(22) PCT Filed: Apr. 10, 1998
(86) PCT No.: PCT/JP98/01659
§ 371 Date: Oct. 8, 1999
§ 102(e) Date: Oct. 8, 1999
(87) PCT Pub. No.: WO98/46957
PCT Pub. Date: Oct. 22, 1998

(30) Foreign Application Priority Data

Apr. 11, 1997 (JP) .................................................. 9-110142

(51) Int. Cl.⁷ ............................ F25D 17/06; F25D 23/00
(52) U.S. Cl. ........................................................................ 62/94
(58) Field of Search ............................... 62/271, 94, 198

(56) References Cited

U.S. PATENT DOCUMENTS

| | | | |
|---|---|---|---|
| 4,887,438 | 12/1989 | Meckler | 62/271 |
| 5,325,676 | 7/1994 | Meckler | 62/93 |
| 5,353,606 * | 10/1994 | Yoho et al. | 62/271 |
| 5,364,455 | 11/1994 | Komarneni et al. | 95/117 |
| 5,517,828 * | 5/1996 | Calton et al. | 62/271 |
| 5,718,122 | 2/1998 | Maeda | 62/185 |
| 5,758,509 | 6/1998 | Maeda | 62/94 |
| 5,761,923 | 6/1998 | Maeda | 62/271 |
| 5,761,925 | 6/1998 | Maeda | 62/476 |
| 5,816,065 | 10/1998 | Maeda | 62/271 |
| 5,931,015 | 8/1999 | Maeda | 62/271 |
| 5,943,874 | 8/1999 | Maeda | 62/271 |
| 5,950,442 | 9/1999 | Maeda | 62/175 |
| 5,950,447 | 9/1999 | Maeda et al. | 62/271 |

FOREIGN PATENT DOCUMENTS

| | | |
|---|---|---|
| 61-138038 | 6/1986 | (JP) . |
| 6-101930 | 4/1994 | (JP) . |
| 8-14600 | 1/1996 | (JP) . |

* cited by examiner

Primary Examiner—William Wayner
(74) Attorney, Agent, or Firm—Armstrong, Westerman, Hattori, McLeland & Naughton

(57) ABSTRACT

This invention provides an energy saving air conditioning system having an improved dehumidifying ability by raising the temperature or enthalpy of a compressed superheated vapor of a refrigerant for the heat pump, thereby to increase the proportion of the sensible heat in the heat discharged in a high-temperature heat source of the heat pump, and then increased enthalpy is used to heat regeneration air to improve the dehumidifying capability of the desiccant. The system includes a desiccant 103 for dehumidifying process air, a heat pump 200 having a compressor 260 for supplying heat to regeneration air for regenerating the desiccant, by utilizing process air as a low temperature source 240 and regeneration air as a high temperature source 220, and the system is operated so as to heat the refrigerant flowing into the compressor in the heat pump with regeneration air after it has regenerated the desiccant, so that the temperature of the compressed refrigerant flowing into the compressor will be increased, and then the gained heat is transferred to the regeneration air to increase its temperature before regenerating the desiccant.

9 Claims, 12 Drawing Sheets

AIR CONDITIONING SYSTEM AND METHOD FOR OPERATING THE SAME

TECHNICAL FIELD

This invention relates to air conditioning systems, and relates in particular to an air conditioning system that can operate continually air dehumidifying process by a desiccant and regeneration of the desiccant by heat pump.

BACKGROUND ART

FIG. 8 shows a system based on the conventional technology disclosed in a U.S. Pat. No. 4,430,864, which is comprised by: process air passage A; regeneration air passage B; two desiccant beds 103A, 103B; a heat pump 200 for regeneration of desiccant and cooling of process air. The heat pump 200 uses heat exchangers 220, 210 embedded in the desiccant beds 103A, 103B as high and low temperature heat sources respectively, in which one desiccant bed performs dehumidifying by passing process air, and the other desiccant bed performs regeneration of desiccant beds by passing regeneration air. After air conditioning is carried out for a specific time interval, four-way switching valves 105, 106 are operated to perform reverse processes in respective desiccant beds by flowing regeneration air and process air in the opposite desiccant beds.

In the conventional technology described above, high/low heat source of the heat pump 200 and each desiccant are integrated in each unit, and, an amount of heat equivalent to the cooling effect ΔQ, is totally loaded on the heat pump (vapor compression cycle). That is, cooling effect cannot exceed the capability of the heat pump (vapor compression cycle) used. Therefore, there is no benefit resulting from making the system complex.

Therefore, to resolve such problems, it is possible to consider a system, such as the one shown in FIG. 9, to heat the regeneration air by placing a high temperature source 220 in the regeneration air passage B, and placing a low temperature air source 240 in the process air passage A to cool the process air, as well as to provide a heat exchanger 104 for exchanging sensible heat between the post-desiccant process air and pre-desiccant regeneration air. In this case, the desiccant 103 uses a desiccant wheel which rotates so as to straddle the process air passage A and the regeneration air passage B.

This system can provide cooling effects (ΔQ), which is a sum of the cooling effects produced by the heat pump and the cooling effects produced by sensible heat exchange performed between process air and regeneration air, as shown in the psychrometric chart presented in FIG. 10, thus producing a system of a more compact design and capable of generating a higher cooling effects than that produced by the system shown in FIG. 8.

In such a heat pump, it is necessary to provide a high-temperature heat source with a temperature of over 65° C. for desiccant regeneration, and a low-temperature heat source with a temperature of about 10° C. for cooling process air. A vapor compression type cooling process for a refrigerant HFC134a is shown in a Mollier diagram shown in FIG. 11. As shown in FIG. 11, the width of temperature rise is 55° C., and the pressure ratio and compressor power are closer to the heat pump in conventional air conditioning system based on refrigerant HCFC22. Therefore, there is a possibility of constructing a heat pump using a compressor for HCFC22 for desiccant regeneration in air conditioning systems, and if the sensible heat in the superheated vapor at the compressor exit (80° C. in FIG. 11) can be utilized, there is a possibility that the regeneration air can be heated to a temperature higher than the condensation temperature.

In a system of such a configuration, when the total volume of the regeneration air is subjected to heat exchange by the high-temperature source heat exchanger of the heat pump, the relation between temperature change and enthalpy for the refrigerant and regeneration air is as shown in FIG. 12. As shown in FIG. 12, if the temperature fraction at the condensation heat conduction region, where the refrigerant of the high-temperature heat source 220 of the heat exchanger is condensed, is taken as 80%, regeneration air can be heated from 40° C. to about 60° C., but the amount of heat that can be supplied by the super-heated vapor of the refrigerant in the overall capability of the heat pump side of the system is only about 12% of the total heat generated, as shown in FIG. 11. For this reason, heating of regeneration air by the 12% contribution is:

(20° C/0.88)×0.12=2.7° C., so that sensible heat from the super-heated vapor exiting from the compressor hardly contributes to raising of regeneration air, resulting that it is necessary to regenerate the desiccant material at a temperature (62.7° C. in the figure) lower than the condensation temperature.

On the other hand, when using a material such as silica gel for a desiccant material, the higher the desiccant regeneration temperature up to about 90° C., moisture adsorption capability is higher, therefore, the higher the temperature of the regeneration air, latent heat processing capability of the desiccant-assisted air conditioning system is higher and cooling effects are improved. Therefore, to achieve this end objective, if the condensation temperature is increased to about 75° C. in an effort to increase the regeneration temperature, in the resulting process, the condensation pressure of the refrigerant becomes abnormally high (24.1 kg/cm$^2$) as shown by the dotted line in FIG. 11, and it is no longer possible to use HCFC22 compressor in designing a heat pump for use in a desiccant air conditioning system. The compressor power is also increased and the performance factor drops.

This invention has been made to provide an air conditioning system that enables to raise the temperature of superheated vapor of the compressed refrigerant in the heat pump, that is, to increase its enthalpy, so as to increase the proportion of sensible heat in an output heat from the high temperature heat source of the heat pump, for heating the regeneration air so as to increase dehumidifying capability of the desiccant. Such a system has a superior dehumidifying capability and produces energy saving, and by obtaining heat sources for regenerating the desiccant from both process air and regeneration air, the desiccant can be regenerated separately before starting the system, and when the sensible heat is small, the system can be operated chiefly through dehumidifying the process air.

This invention has been made in view of the problems described, and the object is to provide a system and a method of operating the system, in which adsorption of moisture by a desiccant and desiccant regeneration to remove adsorbed moisture by a heat pump are performed continually, and the refrigerant flowing in the heat pump is heated by post-desiccant regeneration air to raise the temperature of super-heated vapor, i.e., its enthalpy of compressed refrigerant, thereby increasing the proportion of sensible heat output from the high temperature source of the heat pump before allowing heat exchange to take place with the regeneration air to increase the regeneration temperature of desiccant, thereby increasing the dehumidifying capability of the desiccant. Another object of the invention is to provide an air conditioning system in which, by providing the low-temperature heat source heat exchanger of the heat pump for both process air and regeneration air, and by switching the flow direction of the refrigerant flowing into the compressor, heat source can be obtained for both process air and regeneration air so that regeneration of desiccant can be performed separately before starting the system, and further, when the sensible load is small, the system can be operated based primarily on dehumidifying the process air, thus to provide an air conditioning system having a superior dehumidifying capability and performance characteristics as well as flexible in meeting the requirements of the air conditioning system, and resulting in energy saving.

DISCLOSURE OF INVENTION

This invention is provided to achieve the above objectives, and the invention disclosed in claim 1 relates to an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein a refrigerant flowing into the compressor of the heat pump is heated with post-desiccant regeneration air that has regenerated the desiccant, thereby raising the temperature of the refrigerant after compression, which then exchanges heat with pre-desiccant regeneration air before it regenerates the desiccant.

Accordingly, by heating the refrigerant flowing into the compressor with post-desiccant regeneration air, so as to raise the temperature of the compressed superheated vapor of a refrigerant, i.e., its enthalpy of the vapor is increased, thereby increasing the proportion of the sensible heat in the heat discharged in a high-temperature heat source of a heat pump, and then the regeneration air is heated to increase the dehumidifying capability of a desiccant, thereby providing an energy conserving system with a superior dehumidifying capability. This process raises the regeneration temperature and increases the dehumidifying capability of the desiccant.

The invention disclosed in claim 2 relates to an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein a low-temperature heat source of the heat pump is comprised by at least two heat exchangers, and wherein a first low-temperature heat source heat exchanger exchanges heat with process air flowing in a downstream side of a desiccant, and a second low-temperature heat source heat exchanger exchanges heat with regeneration air flowing in a downstream side of the desiccant, and a refrigerant is made to flow into the compressor by selecting either a forward path from the first low-temperature heat source heat exchanger to the second low-temperature heat source heat exchanger or a reverse path from the second low-temperature heat source heat exchanger to the first low-temperature heat source heat exchanger.

Accordingly, by selectively switching the flow direction of the refrigerant flowing in two low-temperature heat source heat exchangers for transferring heat with the process air and the regeneration air, heat can be obtained from either the process air or regeneration air, thereby enabling to perform air conditioning when it is desired to provide primarily dehumidifying when the sensible heat is low, or when the desiccant alone is to be regenerated.

The invention disclosed in claim 3 relates to an air conditioning system comprised by: a desiccant for adsorbing moisture for process air; and a heat pump, including a compressor, that operates by using process air as a low-temperature heat source and regeneration air as a high-temperature heat source so as to supply heat to regeneration air for regenerating the desiccant; wherein paths of process air and regeneration air that pass through the desiccant are divided into a first zone for performing dehumidifying of process air and a second zone for performing regeneration of the desiccant using regeneration air so that the desiccant repeatedly shifts its position between the first zone and the second zone, and the heat pump is comprised by at least a compressor and a first low-temperature heat source heat exchanger, a second low-temperature heat source heat exchanger and a high-temperature heat source heat exchanger, and process air is made to pass through the desiccant in the first zone, the first low-temperature heat source heat exchanger of the heat pump, and then to enter a conditioning space, and the regeneration air is made to pass through the high-temperature heat source heat exchanger of the heat pump, the desiccant in the second zone and the second low-temperature heat source heat exchanger of the heat pump before being discharged outside, and a refrigerant is made to flow into the compressor by selecting either a forward path from the first low-temperature heat source heat exchanger to the second low-temperature heat source heat exchanger or a reverse path from the second low-temperature heat source heat exchanger to the first low-temperature heat source heat exchanger.

Accordingly, adsorption process and regeneration process of desiccant can be carried out continuously, and by selectively switching the flow direction of the refrigerant flowing in two low-temperature heat source heat exchangers for transferring heat with the process air and the regeneration air, heat can be obtained from either the process air or regeneration air, and an example of various modes of operation made possible by such a system is, by heating the refrigerant flowing into the compressor with post-desiccant regeneration air, so as to raise the temperature of the compressed superheated vapor of a refrigerant, i.e., its enthalpy of the vapor is increased, thereby increasing the proportion of the sensible heat in the heat discharged in a high-temperature heat source of a heat pump, and then the regeneration air is heated to increase the dehumidifying capability of a desiccant, and as an example of another mode of operation is, by changing the direction of flow of the refrigerant, dehumidifying operation only is possible when the sensible heat fraction is low, or the desiccant may be regenerated before starting the air conditioning system.

The invention disclosed in claim 4 is an air conditioning system according to claim 3, wherein the desiccant has a wheel shape so that, by rotating the desiccant, it repeatedly shifts its position between the first zone and the second zone.

Accordingly, by making the desiccant a rotating desiccant enabled to perform dehumidifying process by the desiccant and regeneration process for the desiccant using the superheated vapor of the refrigerant continually.

The invention disclosed in claim 5 is an air conditioning system according to anyone of claims 1 to 4, wherein, by selecting a path for a refrigerant to flow from the first low-temperature heat source heat exchanger to the second low-temperature heat source heat exchanger and into the compressor, the refrigerant flowing into the compressor is heated by post-desiccant regeneration air that has regenerated the desiccant so as to raise the temperature of compressed refrigerant before allowing transfer of heat with pre-desiccant regeneration air in the high-temperature heat source heat exchanger.

Accordingly, by selectively switching the flow direction of the refrigerant flowing in two low-temperature heat source heat exchangers for transferring heat with the process air and the regeneration air, heat can be obtained from either the process air or regeneration air, thereby enabling to perform an example of air conditioning such that, by heating the refrigerant flowing into the compressor with post-desiccant regeneration air, so as to raise the temperature of the compressed superheated vapor of a refrigerant, i.e., its enthalpy of the vapor is increased, thereby increasing the proportion of the sensible heat in the heat discharged in a high-temperature heat source of a heat pump, and then the regeneration air is heated to increase the dehumidifying capability of a desiccant.

The invention disclosed in claim 6 is an air conditioning system according to any one of claims 2 to 4, wherein, by selecting a path for a refrigerant to flow from the second low-temperature heat source heat exchanger to the first low-temperature heat source heat exchanger and into the compressor, heat recovered from post-desiccant regeneration air is used to heat pre-desiccant regeneration air.

Accordingly, by selecting the direction of flow of the refrigerant flowing in two low-temperature heat source heat exchangers of the heat pump for heat exchanges with process air and regeneration air, heat can be obtained from regeneration air for desiccant regeneration, so as to permit air conditioning when the sensible heat fraction is very low, or then the desiccant is to be regenerated alone before stating the system.

The invention disclosed in claim 7 is a method for operating an air conditioning system disclosed in any one of claims 2 to 4, including the steps of: flowing regeneration air; stopping process air flow; selecting a path for a refrigerant to flow from the second low-temperature heat source heat exchanger to the first low-temperature heat source heat exchanger and into the compressor, and heat recovered from post-desiccant regeneration air is used to regenerate the desiccant before startup of the system.

Accordingly, without discharging process air that has not been sufficiently dehumidified when starting the system, heat can be obtained from regeneration air for desiccant regeneration while suppressing moisture adsorption by the desiccant, therefore, regeneration time is shortened to produce a desiccant-assisted air conditioning system having a good startup properties and pleasing performance.

The invention disclosed in claim 8 is an air conditioning system according to any one of claims 2 to 4, wherein a four-way valve is chosen as means for selecting a path of a refrigerant to flow from the first low-temperature heat source heat exchanger to the second low-temperature heat source heat exchanger and into the compressor, or from the second low-temperature heat source heat exchanger to the first low-temperature heat source heat exchanger and into the compressor, the four-way valve can select a path of connecting an expansion valve with either the first low-temperature heat source heat exchanger or the second low-temperature heat source heat exchanger, and also can select a path of connecting either the second low-temperature heat source heat exchanger or the first low-temperature heat source heat exchanger to the compressor, the air conditioning system further comprising a bypass passage having a bypass valve and branching from a passage joining the high-temperature heat source heat exchanger to the four-way valve through the expansion valve, and merging with a passage connecting the first low-temperature heat source heat exchanger and the second low-temperature heat source heat exchanger, and wherein, when heating pre-desiccant regeneration air by receiving heat produced by operating the first low-temperature heat source heat exchanger and the second low-temperature heat source heat exchanger, a degree of opening of the bypass valve is adjusted so as to flow unevaporated refrigerant to a passage connecting the first low-temperature heat source heat exchanger and the second low-temperature heat source heat exchanger.

Accordingly, by choosing a four-way valve as a means for selecting the flow path of the refrigerant flowing into the compressor, and by arranging the paths so that unevaporated refrigerant can be input in a middle section between the two low-temperature heat source heat exchangers branched from a passage connecting the high-temperature heat source heat exchanger with the four-way valve through the expansion valve, four modes of operation are made possible: [cooling] mode of operation in which desiccant regeneration heat source is obtained from process air; [cooling and dehumidifying] mode in which desiccant regeneration heat is obtained from both process air and regeneration air; [dehumidifying] mode of operation in which desiccant regeneration heat is obtained from regeneration air; and [desiccant regeneration] mode in which the process air is stopped, and desiccant regeneration heat is obtained from regeneration air.

The invention disclosed in claim 9 is a method for operating an air conditioning system according to any one of claims 6 to 8 for performing primarily dehumidifying air by lowering a sensible heat fraction in the air conditioning system.

Accordingly, a variety of sensible heat loading can be processed by having the control device to select an operational mode.

BEST MODE FOR CARRYING OUT THE INVENTION

Preferred embodiments will be presented with reference to the drawings.

Figure 1:
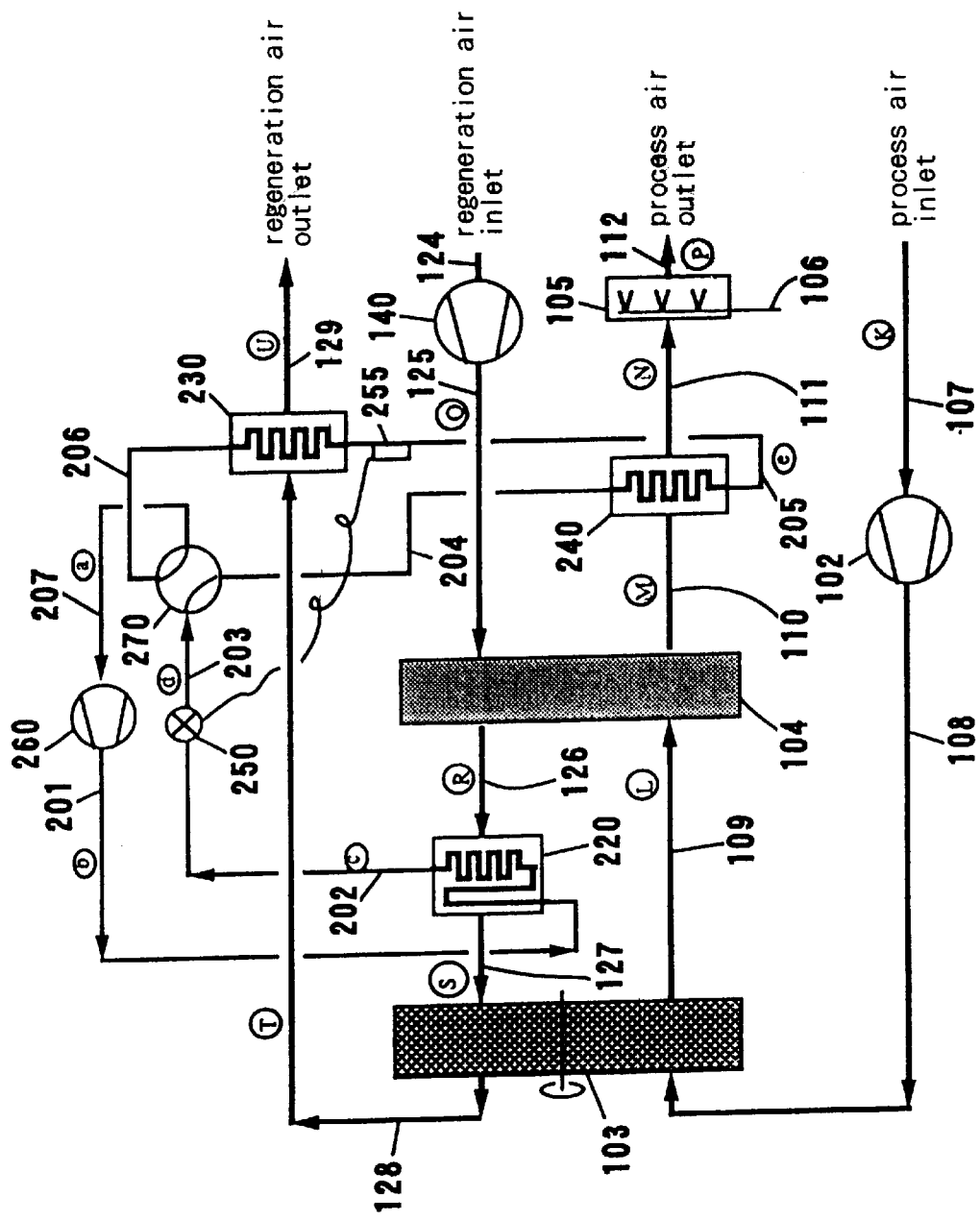
FIG. 1 is a diagram to explain the basic structure of a first embodiment of the air conditioning system.

FIG. 1 shows a diagram of the basic structure of a first embodiment of the air conditioning system of the present invention. A vapor compression type heat pump 200 comprises: a compressor 260; a first low-temperature heat source heat exchanger (evaporator) 240; a second low-temperature heat source heat exchanger (evaporator) 230; a high-temperature heat source heat exchanger (condenser) 220; and an expansion valve 250 so as to construct a vapor compression type refrigeration circuit. A four-way valve 270 is provided in a passage from an expansion valve 250 in this circuit to the compressor 260. The four-way valve 270 selectively switches the flow of the refrigerant heading towards the inlet of the compressor 260 between the two paths as follows. One path takes the refrigerant exiting the expansion valve 250 to four-way valve 270, a first low-temperature heat source heat exchanger (evaporator) 240, a second low-temperature heat source heat exchanger (evaporator) 230, and to a passage 207 to the inlet of the compressor via the other path of the four-way valve 270. The other path takes the refrigerant through the expansion valve 250 to four-way valve 270; a second low-temperature heat source heat exchanger (evaporator) 230; a first low-temperature heat source heat exchanger (evaporator) 240, and to a passage 207 to the inlet of the compressor via the other path of the four-way valve 270. In the first low-temperature heat source heat exchanger (evaporator) 240, refrigerant vapor at low pressure exchanges heat with post-desiccant process air, and in the second low-temperature heat source heat exchanger (evaporator) 230, refrigerant vapor at low pressure exchanges heat with post-desiccant regeneration air, and in the high-temperature heat source heat exchanger (condenser) 220, refrigerant vapor at high pressure exchanges heat with pre-desiccant regeneration air.

Figure 9:
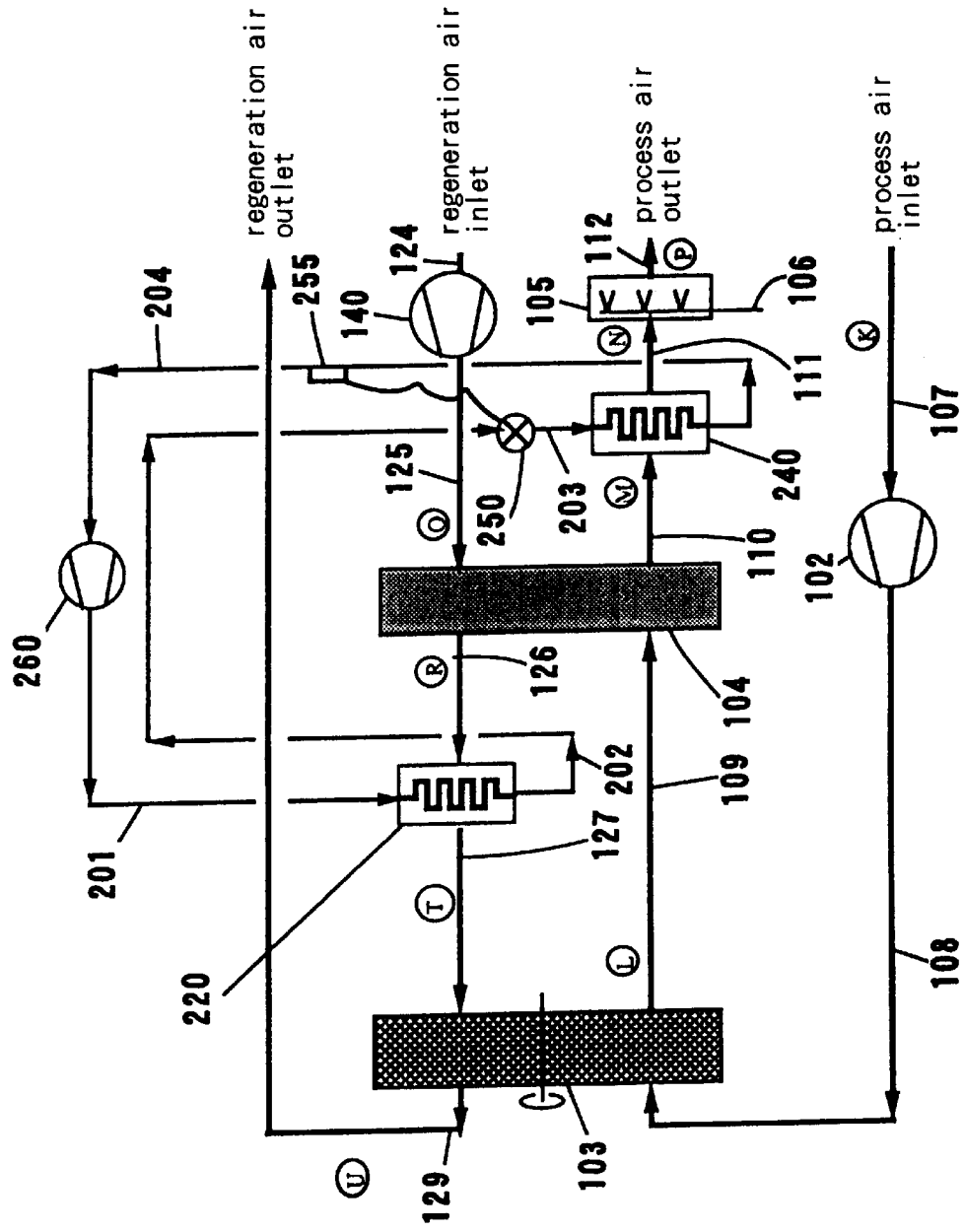
FIG. 9 is a diagram of another conventional desiccant-assisted air conditioning system.
Figure 10:
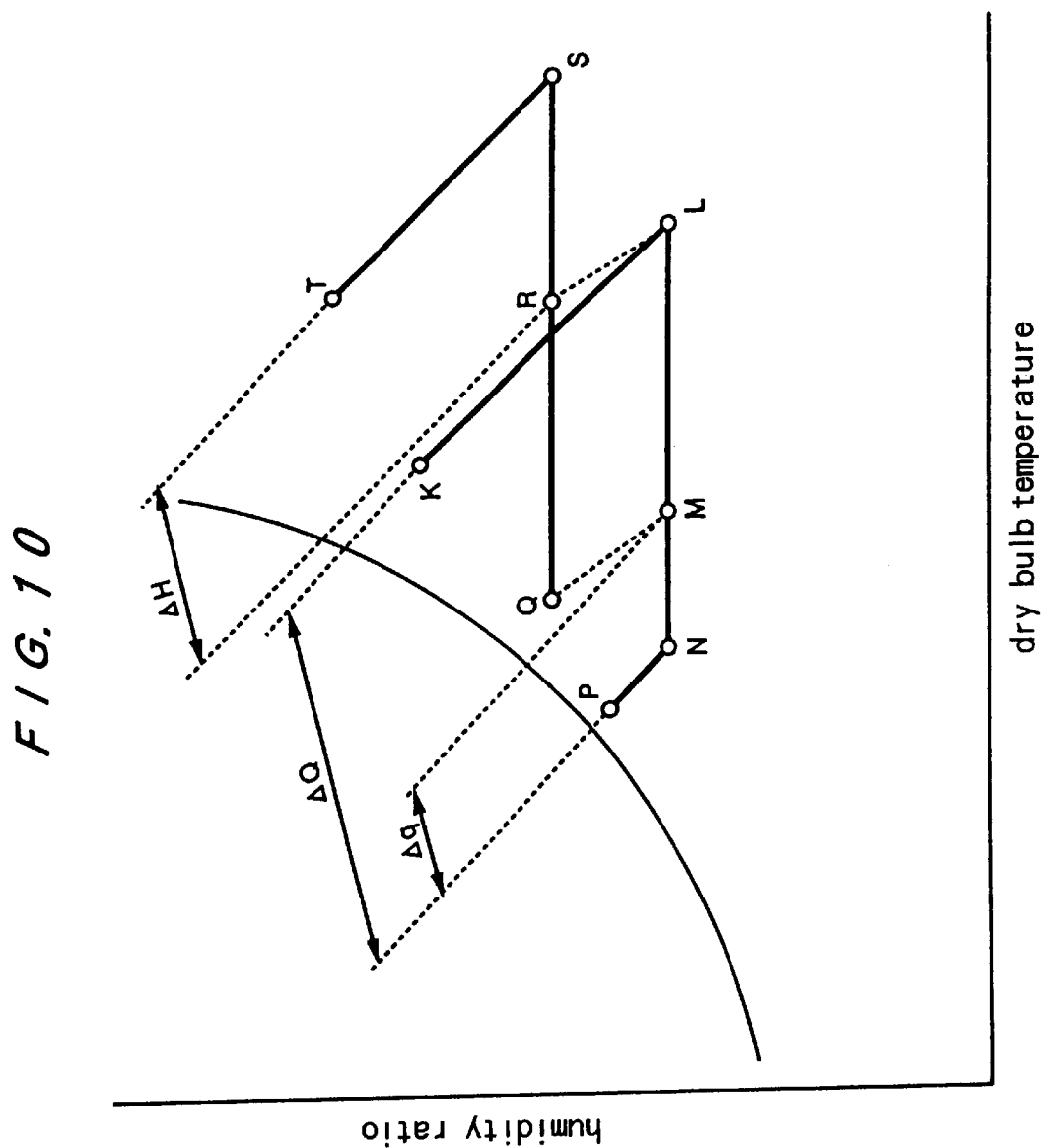
FIG. 10 is a psychrometric chart showing desiccant air conditioning process in the conventional system shown in FIG. 9.

Desiccant wheel 103 rotates at a given rotational speed while straddling both the process air passage A and the regeneration (desorption) air passage B, as explained in FIG. 9. In the process air passage A, the inlet of the blower 102 for return air is connected to the conditioning space through a passage 107, and the outlet of the blower 102 is connected to the first zone that perform moisture adsorption in the desiccant wheel 103 through a passage 108, and the outlet of the desiccant wheel 103 for the process air is connected to a sensible heat exchanger 104 for heat exchange with regeneration air through a passage 109, and the outlet of the sensible heat exchanger 104 for the process air is connected to the first low-temperature heat source heat exchanger (evaporator) 240 through a passage 110, and the outlet of the first low-temperature heat source heat exchanger (evaporator) 240 for process air is connected to a humidifier 105 through a passage 111, and the outlet of the humidifier 105 is connected to an outlet for processed air or a room air supply opening through a passage 112. This sequence constitutes a process air circuit.

In the meantime, regeneration air passage B is connected to the inlet of the blower 140 for admitting outdoor air for use as regeneration air through a passage 124, and the outlet of the blower 140 is connected to the sensible heat exchanger 104 for exchanging heat with process air, and the outlet of the sensible heat exchanger 104 for regeneration air is connected to the high-temperature heat source heat exchanger (condenser) 220 through a passage 126, and the outlet of the high-temperature heat source heat exchanger 220 for regeneration air is connected to the second zone of the desiccant wheel 103 for performing desiccant regeneration through a passage 127, and the outlet for the regeneration air in the second zone of the desiccant wheel 103 is connected to the second low-temperature heat source heat exchanger 230 through a passage 128, and the outlet of the second low-temperature heat source heat exchanger 230 for regeneration air admits outdoor air through a passage 129. This sequence constitutes a circuit for admitting outdoor air and discharging spent air to outside. In the Figure, circled alphabet letters K~U refer to various states of air discussed in relation to FIG. 3.

A cyclic process in the vapor compression type refrigeration circuit of the desiccant-assisted air conditioning apparatus constructed as described above will be explained in the following. Similar to FIG. 1, the first case relates to refrigerant heading to the inlet of the compressor 260 through the four-way valve 270. Refrigerant exiting from the expansion valve 250 passes through four-way valve 270, a first low-temperature heat source heat exchanger (evaporator) 240, a second low-temperature heat source heat exchanger (evaporator) 230 and passes through the other passage of the four-way valve 270. In this case, in the first low-temperature heat source heat exchanger (evaporator) 240, the refrigerant evaporates by receiving latent heat of evaporation from the process air that has been dehumidified in the desiccant wheel 103, and reaches the second low-temperature heat source heat exchanger (evaporator) 230, through the passage 205, where it exchanges heat with high temperature regeneration air exiting from the desiccant wheel 103, and passes through passage 206, four-way valve 270, passage 207 and returns to the compressor 260 and is compressed. The compressed refrigerant flows into the high-temperature heat source heat exchanger (condenser) 220, through the passage 201, and discharges sensible heat in the superheated vapor and latent heat of condensation to pre-desiccant regeneration air, and reaches expansion valve 250 through the passage 202, expands and reduces pressure, then, through the four-way valve 270 and passage 204, it flows back to the first low-temperature heat source heat exchanger (evaporator) 240.

The thermal process of the refrigerant will be explained with reference to the Mollier diagram shown in FIG. 2. The refrigerant evaporates (state f) in the first low-temperature heat source heat exchanger (evaporator) 240, and reaches the second low-temperature heat source heat exchanger 230, through the passage 205, where it exchanges heat with the high temperature regeneration air exiting from the desiccant wheel 103, and increases its temperature and becomes superheated vapor (state a), and passes through passage 206, four-way valve 270, passage 207, to be drawn into the compressor 260 to be compressed. The compressed refrigerant (state b) passes through passage 201 and flows into the high-temperature heat source heat exchanger (condenser) 220, and releases sensible heat of superheated vapor and latent heat of condensation to pre-desiccant regeneration air, and condenses (state d). Condensed refrigerant reaches expansion valve 250, where it reduces its pressure by expanding (state e), passes through four-way valve 270 and passage 204, and flows back to the first low-temperature heat source heat exchanger (evaporator) 240. Here, as shown in FIG. 1, a temperature sensor tube 255 of the expansion valve 250 is installed in the path connecting the first low-temperature heat source heat exchanger (evaporator) 240 and the second low temperature heat source heat exchanger 230, and because of this effect, the state of the refrigerant flowing in the passage 205 changes from a dry saturated vapor to mildly superheated vapor, and the refrigerant flowing in the second low-temperature heat source heat exchanger 230 becomes superheated vapor. Heat transfer mechanism in the second low-temperature heat source heat exchanger 230 is thermal conduction, without involving a phase change, between the superheated vapor of the refrigerant and the regeneration air, so that heat transfer efficiency is low, and furthermore, the temperature of regeneration air after regeneration of the desiccant is not very high, so that overheating of the refrigerant is kept at an appropriate level. If there is any danger of overheating the driving mechanism by overheated refrigerant, a cooling jacket may be installed around the motor to circulate saturated vapor at low pressure or a spray of refrigerant may be provided for cooling.

Figure 11:
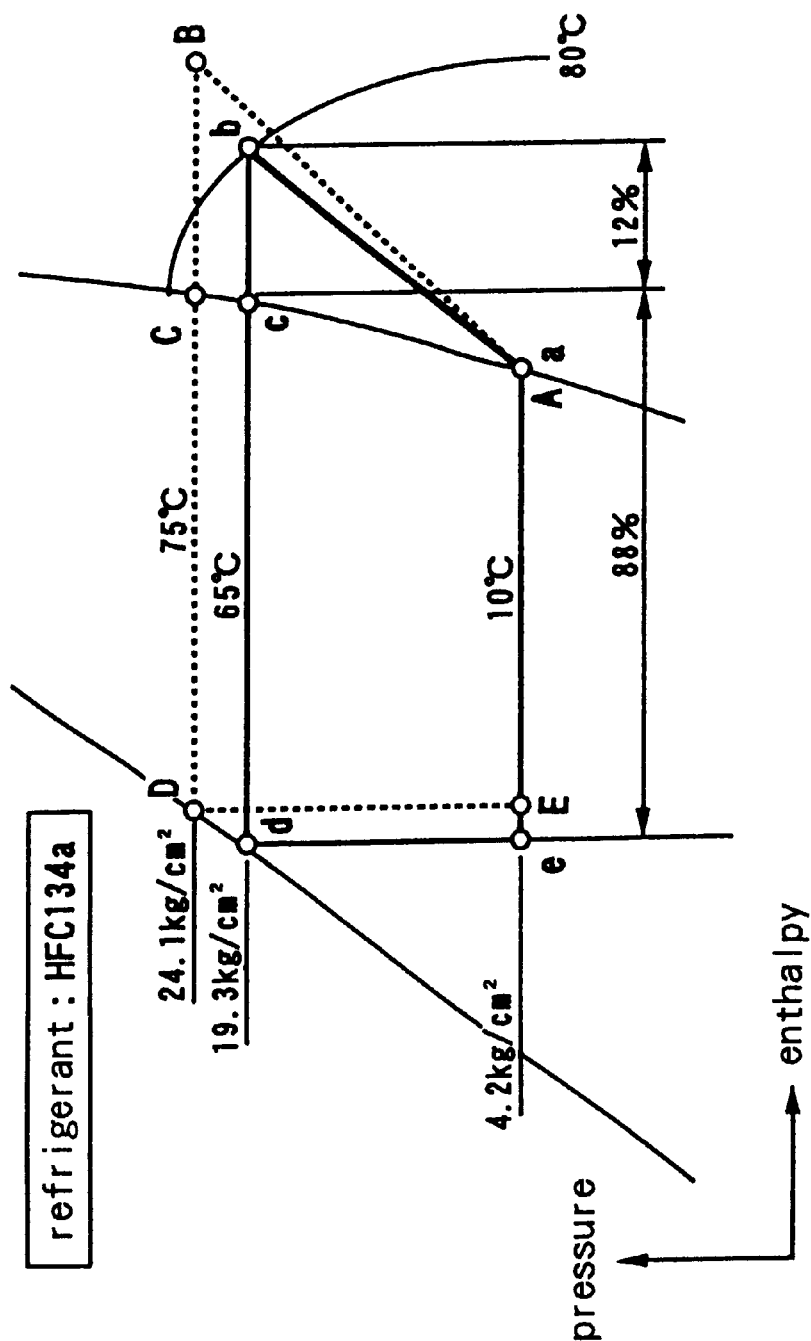
FIG. 11 is a Mollier diagram of a vapor compression type refrigeration process in the conventional desiccant-assisted air conditioning system shown in FIG. 9.
Figure 12:
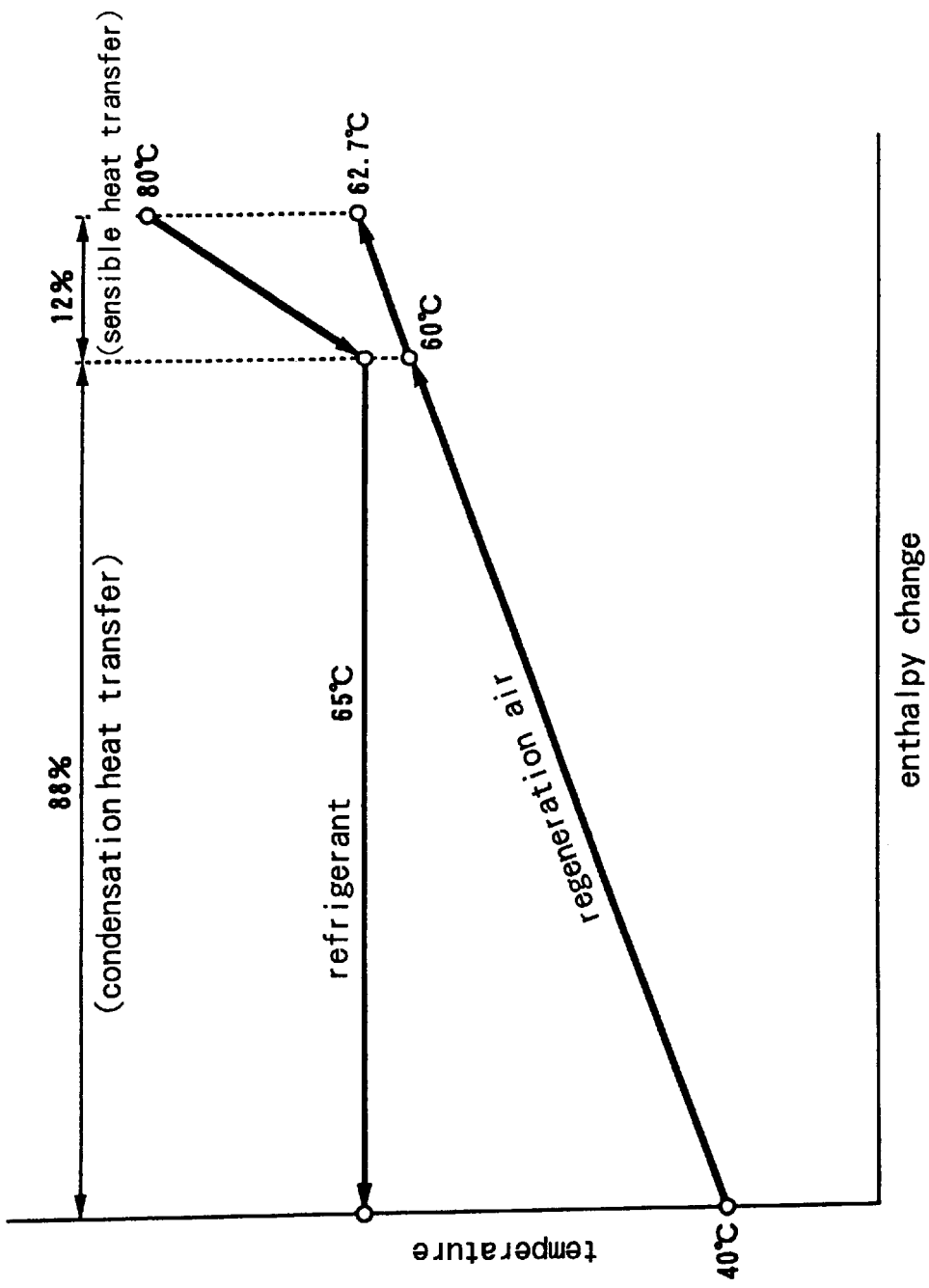
FIG. 12 is a graph showing a relation between temperature and enthalpy change (heat content) of the high pressure refrigerant in the heat pump acting as a heat source and regeneration air in the conventional system shown in FIG. 9.

In this embodiment, refrigerant enthalpy (state a) at the inlet of the compressor 260 is increased due to heat exchange with regeneration air, resulting in increasing the refrigerant enthalpy at the outlet of the compressor 260 or at the inlet to the high-temperature heat source heat exchanger (condenser) 220, and compared with the case shown in FIG. 11, the proportion of sensible heat in the total heat transferred in the high-temperature heat source heat exchanger (condenser) 220 is increased, so that 30% of the total heat generated by the heat pump 200 is sensible heat, and the proportion of latent heat of condensation is 70%.

Figure 3:
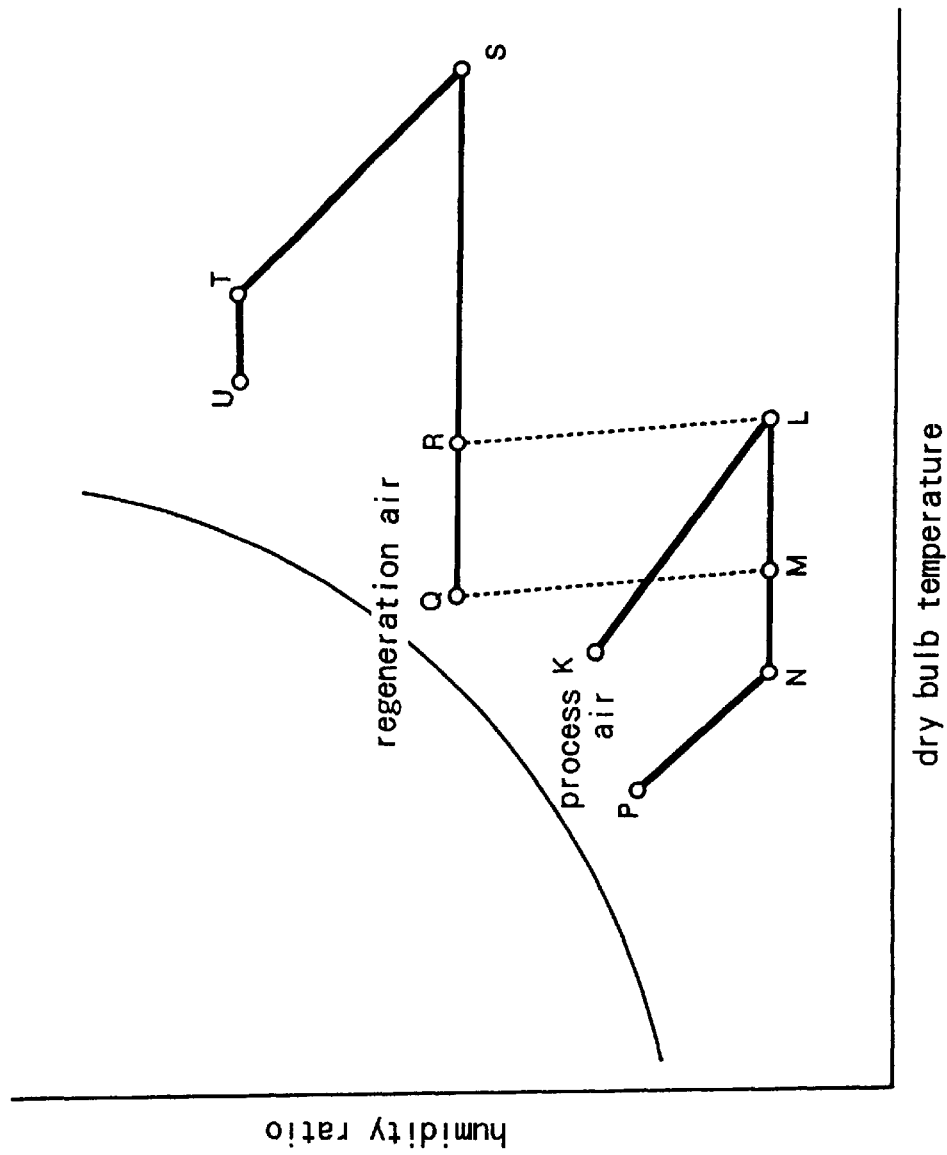
FIG. 3 is a psychrometric chart showing the operation of the desiccant-assisted air conditioning system shown in FIG. 1.

Next, the operation of the desiccant-assisted air conditioning system constructed as above will be explained with Reference to the psychrometric chart shown in FIG. 3. Return air (process air: state K) admitted to the system passes through the passage 107 and is drawn into the blower 102, and is pressurized and sent to the first zone, through the passage 108, to perform moisture adsorption in the desiccant wheel 103, and moisture in the process air is adsorbed in the moisture adsorbent in the desiccant wheel 103, and the process air lowers its humidity ratio and increases its temperature due to transfer of heat of adsorption (state L). Process air that has been lowered in humidity and increased in temperature is sent to sensible heat exchanger 104 through the passage 109, and exchanges heat with outdoor air (regeneration air) and is cooled (state M). Cooled process air passes through the passage 110 and is cooled while passing through the first low-temperature heat source heat exchanger (evaporator) 240 (state N). Cooled process air is sent to the humidifier 105 and is cooled by water spraying or evaporative humidification in an isenthalpic process (state P), and is returned through the passage 112 as supply air to the conditioning space.

On the other hand, regeneration of the desiccant wheel 103 is carried out as follows. Outdoor air (state Q), used as regeneration air, passes through the passage 124, and is drawn into the blower 140, and is pressurized and sent to the sensible heat exchanger 104, where it cools the process air while raising own temperature (state R), and reaches the high-temperature heat source heat exchanger (condenser) 220 through the passage 126, and is heated by the refrigerant vapor to increase its temperature (state S). Regeneration air exiting from the high-temperature heat source heat exchanger (condenser) 220 passes through the second zone of desiccant wheel 103 for performing regeneration, and desorbs moisture from the desiccant wheel 103 (state T), and is sent to the second low-temperature heat source heat exchanger (evaporator) 230 through the passage 128, and heats the refrigerant vapor exiting from the first low-temperature heat source heat exchanger (evaporator) 240 thereby lowering own temperature (state U), and is discarded outside as spent air through the passage 129.

Accordingly, the desiccant-assisted air conditioning system operates by repeating the processes of desiccant regeneration and dehumidifying the process air. In this embodiment, the proportion of sensible heat in the total heat exchanged in the high-temperature heat source heat exchanger (condenser) 220 is increased so that, in the total heat transfer process by the heat pump 200, the proportion of sensible heat transfer is 30% and the proportion of latent heat of condensation transfer is 70%, and by constructing the high-temperature heat source heat exchanger (condenser) 220 as countercurrent type as shown in FIG. 1, the refrigerant flow direction and the regeneration air flow direction to be countercurrent to each other, so that the high temperature refrigerant vapor passes near the desiccant side thereby to raise the temperature of the regeneration air higher than the condensation temperature of the refrigerant by utilizing the sensible heat of superheated vapor of the refrigerant. Therefore, dehumidifying capability of the desiccant is increased. This will be explained in the following using some examples.

Figure 4:
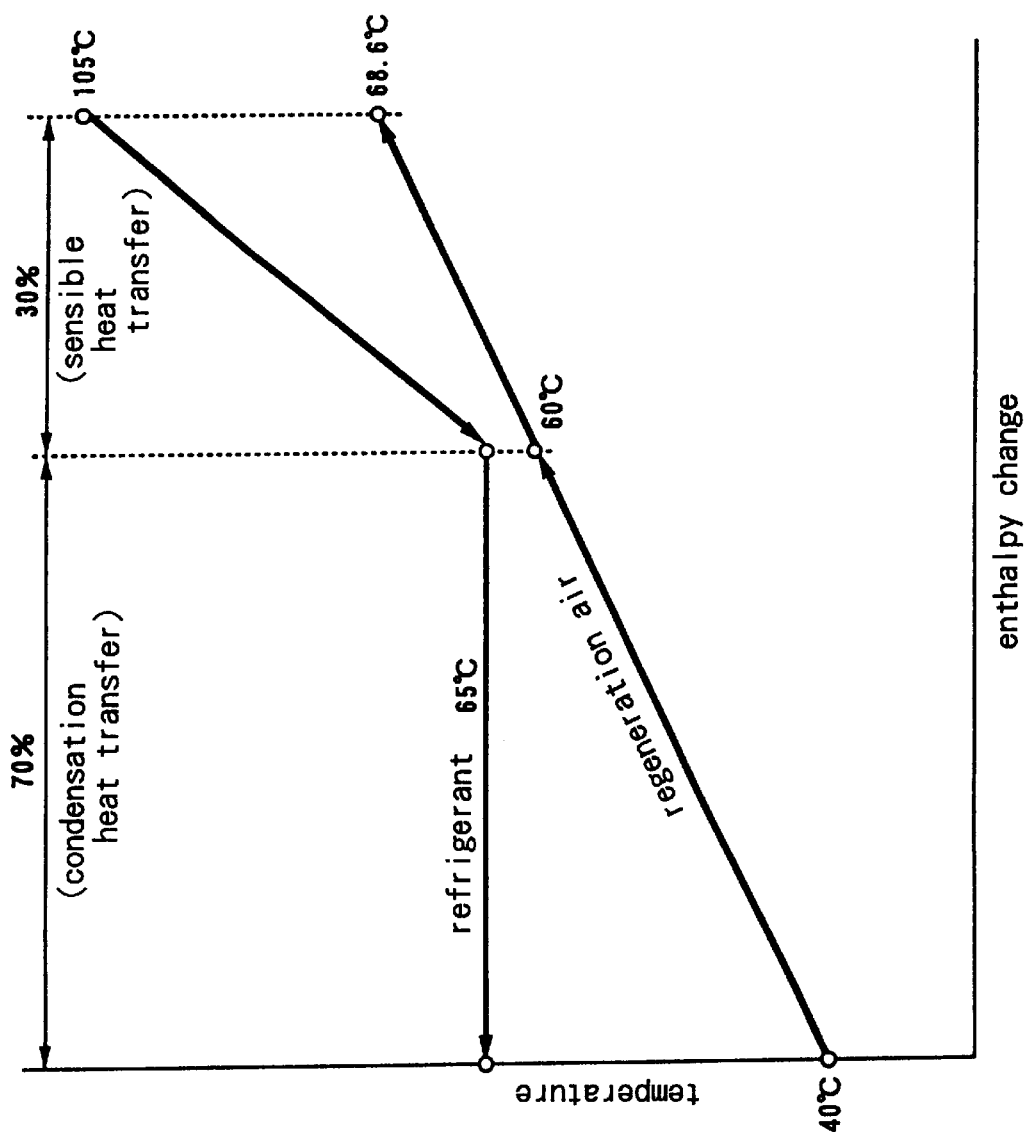
FIG. 4 is a graph showing a relation between temperature and enthalpy change (heat content) of the high pressure refrigerant in the heat pump acting as a heat source and regeneration air in the embodiment shown in FIG. 1.

FIG. 4 shows a graph showing a relationship between temperature and enthalpy (quantity of heat) changes in the high pressure refrigerant serving as heat source in the heat pump 200 and in the regeneration air for the embodiment described in FIG. 1. When the refrigerant in the heat pump 200 exchanges heat with regeneration air, conservation of heat means that the changes in the enthalpy of refrigerant and regeneration air are equal. Also, because air undergoes sensible heat transfer processes with almost constant specific heat, a linear change is observed, and because the refrigerant undergoes latent heat change and sensible heat change, the portion during latent heat change shows no temperature change. Therefore, when the temperature of the regeneration air exiting the condensation section of the high-temperature heat source heat exchanger (condenser) 220 is decided, the temperature of regeneration air at the outlet of the sensible heat exchange section of the high-temperature heat source heat exchanger (condenser) 220 can be calculated from the heat balance, regardless of the temperature of the superheated vapor of the opposing refrigerant.

Figure 2:
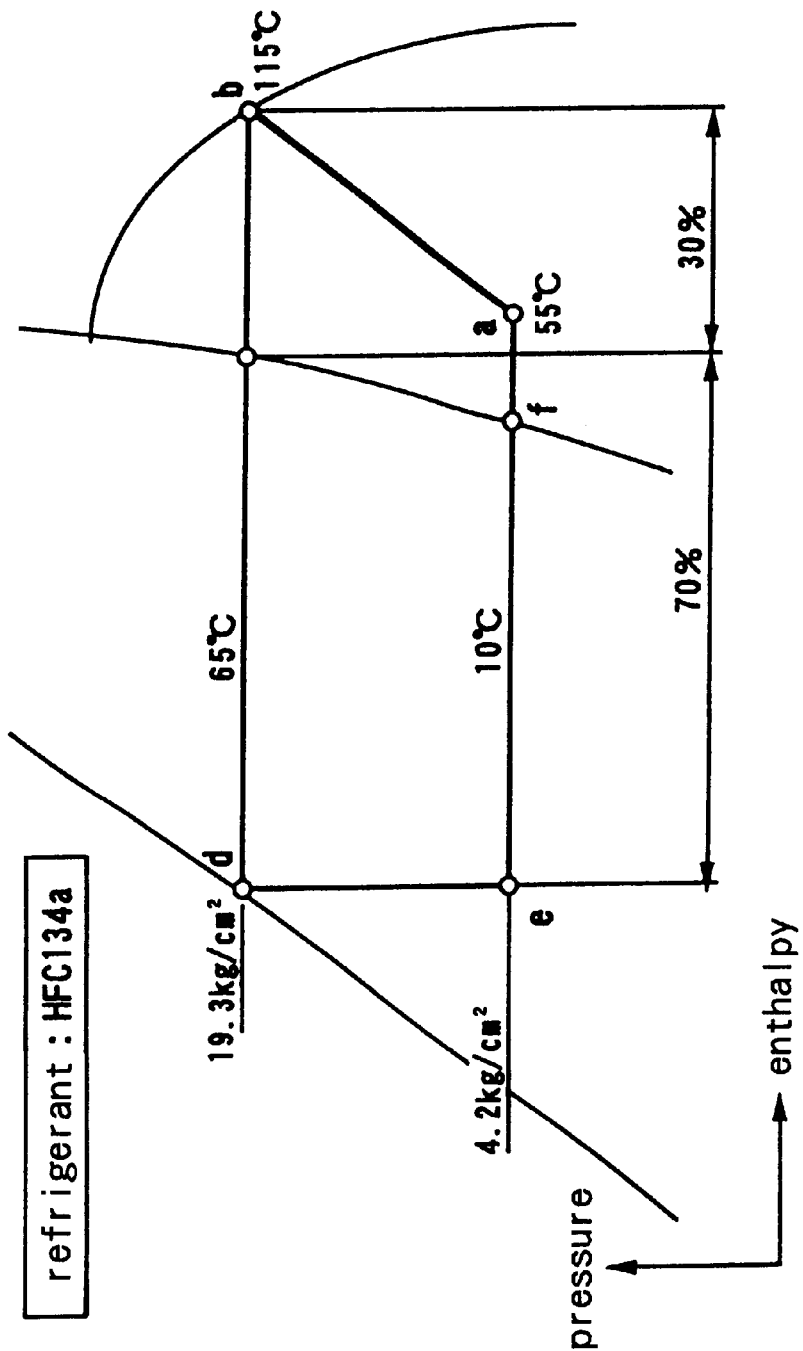
FIG. 2 is a Mollier diagram of the refrigerant process in the heat pump in the air conditioning system shown in FIG. 1.

Therefore, in FIG. 4, if the refrigeration cycle is as shown in FIG. 2, and the inlet temperature of the condenser 220 for the regeneration air is 40° C. and the refrigerant condensation temperature is 65° C., assuming a thermal ratio of 80% in the system of this embodiment, outlet temperature Tc at the condensation section is:

$$Tc = 40 + (65-40) \times 80/100 = 60° \text{ C.}$$

If it is assumed that regeneration air equivalent to 30% of the total heat value is superheated with superheated vapor, outlet temperature at the superheat section Ts is obtained from the above-described heat balance as:

$$Ts = 60 + 20 \times 30/70 = 68.6° \text{ C.}$$

Therefore, it is possible to obtain a temperature for regeneration air that exceeds the condensation temperature 65° C. by 3.6° C.

Accordingly, this system enables to regenerate the desiccant material in the desiccant wheel 103 at a temperature higher than the condensation temperature, therefore, the dehumidifying capability of the desiccant material is superior to that obtained in the conventional system, thereby enabling to provide an energy conserving air conditioning system that can provide superior dehumidifying capability.

Here, it should be mentioned that, in many systems, discharged room air through ventilation process has been widely used for regeneration air, and in this system also, discharged room air can be used to obtain the same results as demonstrated.

Next, in contrast to FIG. 1, in the following case, the direction of flow of the refrigerant heading to the inlet of the compressor 260 through the four-way valve 270 is reversed, so that the refrigerant exiting from the expansion valve 250, passes through four-way valve 270, the second low-temperature heat source heat exchanger (evaporator) 230, the first low-temperature heat source heat exchanger 240 and reaches the other passage of the four-way valve 270 to connect with the passage 207 of the inlet of the compressor. This type of operation is used when the system has been shut down for a long period, and the desiccant is saturated with moisture and is inadequate for proper dehumidification, and is used for a run-up prior to starting up the air conditioning system, so that only the regeneration circuit is operated and the process air circuit is not operated.

In this case, the refrigerant evaporates by receiving latent heat of evaporation in the second low-temperature heat source heat exchanger (evaporator) 230 from the regeneration air after it has regenerated the desiccant 103, and reaches the first low-temperature heat source heat exchanger 240 through the passage 205, but, because the process air operation is stopped, passes through without exchanging heat, and passes through passage 204, four-way valve 270, passage 207 and is drawn into the compressor 260 to be compressed. Compressed refrigerant flows into the high-temperature heat source heat exchanger (condenser) 220 through passage 201, and releases sensible heat in the superheated vapor of the refrigerant and latent heat of condensation to the pre-desiccant regeneration air, and reaches the expansion valve 250 through the passage 202 and flows back to the second low-temperature heat source heat exchanger (evaporator) 230 through the four-way valve 270, the passage 206. In this case, as shown in FIG. 1, the temperature sensor tube 255 of the expansion valve 250 is installed in the path 205 connecting the second low-temperature heat source heat exchanger (evaporator) 230 and the first low-temperature heat source heat exchanger 240, and because of this effect, the refrigerant flowing in the passage 205 changes from dry saturated vapor to super-heated vapor of moderate overheating, and it passes through the first low-temperature heat source heat exchanger 240 in this state to be drawn into the compressor 260. Accordingly, one expansion valve can be used in two operating modes.

Figure 5:
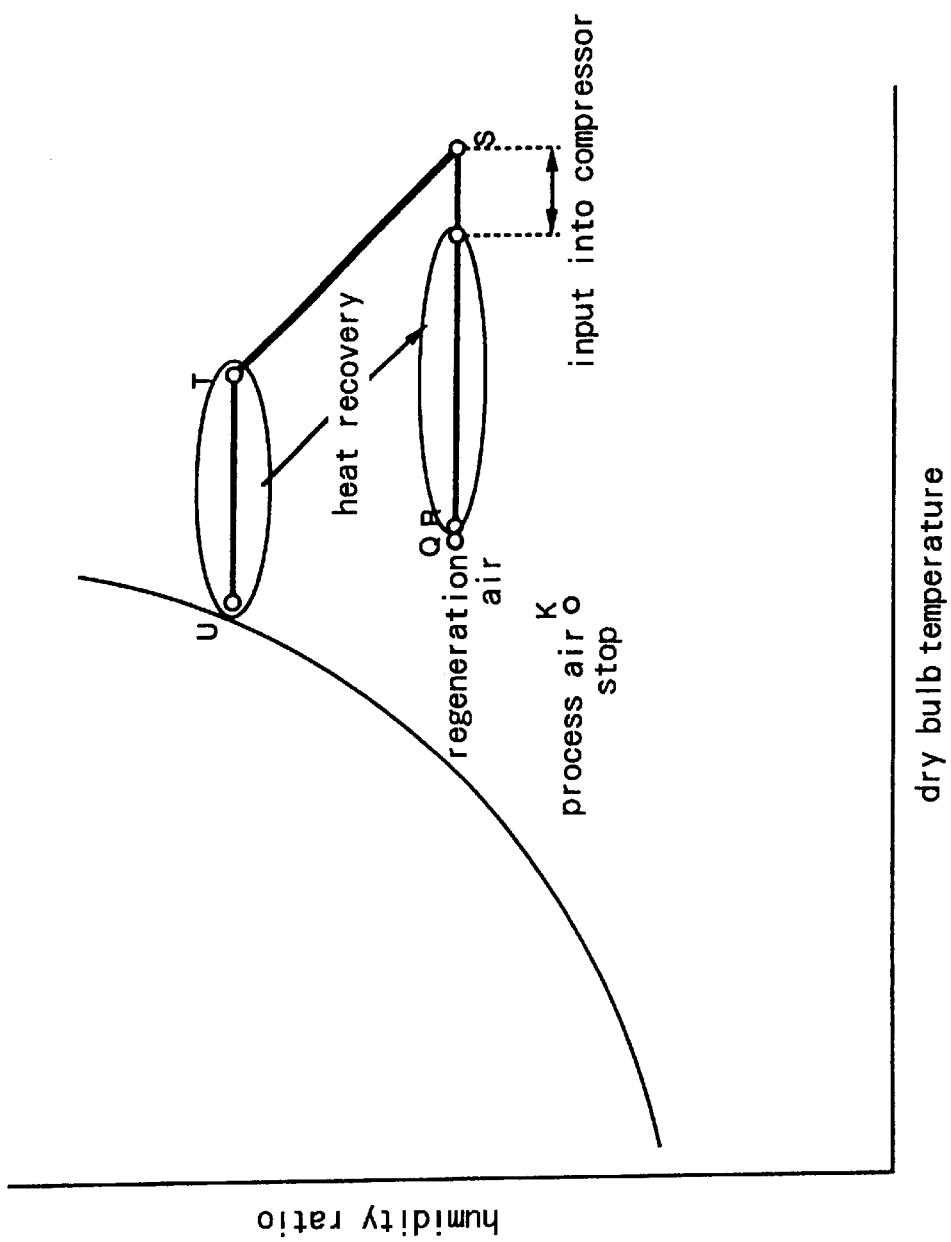
FIG. 5 is a psychrometric chart showing the operation of the first embodiment system in another settings.

Next, the operation of the desiccant-assisted air conditioning system will be explained with reference to the psychrometric chart shown in FIG. 5. Desiccant regeneration is carried out as follows. Process air circuit is stopped (state K), and supply air is not supplied to the conditioning space. Therefore, insufficiently humid air is not supplied to the room, and the desiccant is not loaded with additional moisture. Outdoor air (state Q) to be used as regeneration air is drawn into the blower 140 through the passage 124 and is pressurized, and is sent the sensible heat exchanger 104, but because the process air is stopped, it passes through without exchanging heat (state R=Q) and is sent to the high-temperature heat source heat exchanger (condenser) 220 through the passage 126, and is heated by the vapor of the refrigerant, and increases its temperature (state S). Regeneration air exiting the high-temperature heat source heat exchanger (condenser) 220 passes through the second zone to perform regeneration of desiccant wheel 103 by desorbing moisture from the desiccant material (state T), and is sent to the second low-temperature heat source heat exchanger (evaporator) 230 through the passage 128 (state T), and is discarded to outside as spent air through the passage 129.

Accordingly, desiccant regeneration is performed by flowing only the regeneration air, but because it is regenerated while preventing addition of moisture to the desiccant material, regeneration can be carried out quickly. In other words, the desiccant wheel 103 is normally rotated at about 20 times an hour, so that the time for a complete rotation of the wheel is about 3 minutes, and if the moisture addition is suppressed, one revolution is sufficient to regenerate the desiccant material so that when the heat pump 200 is started up, desiccant can be regenerated with only extra three minutes over a total time required for starting the heat pump 200 and raising the desiccant temperature.

Figure 6:
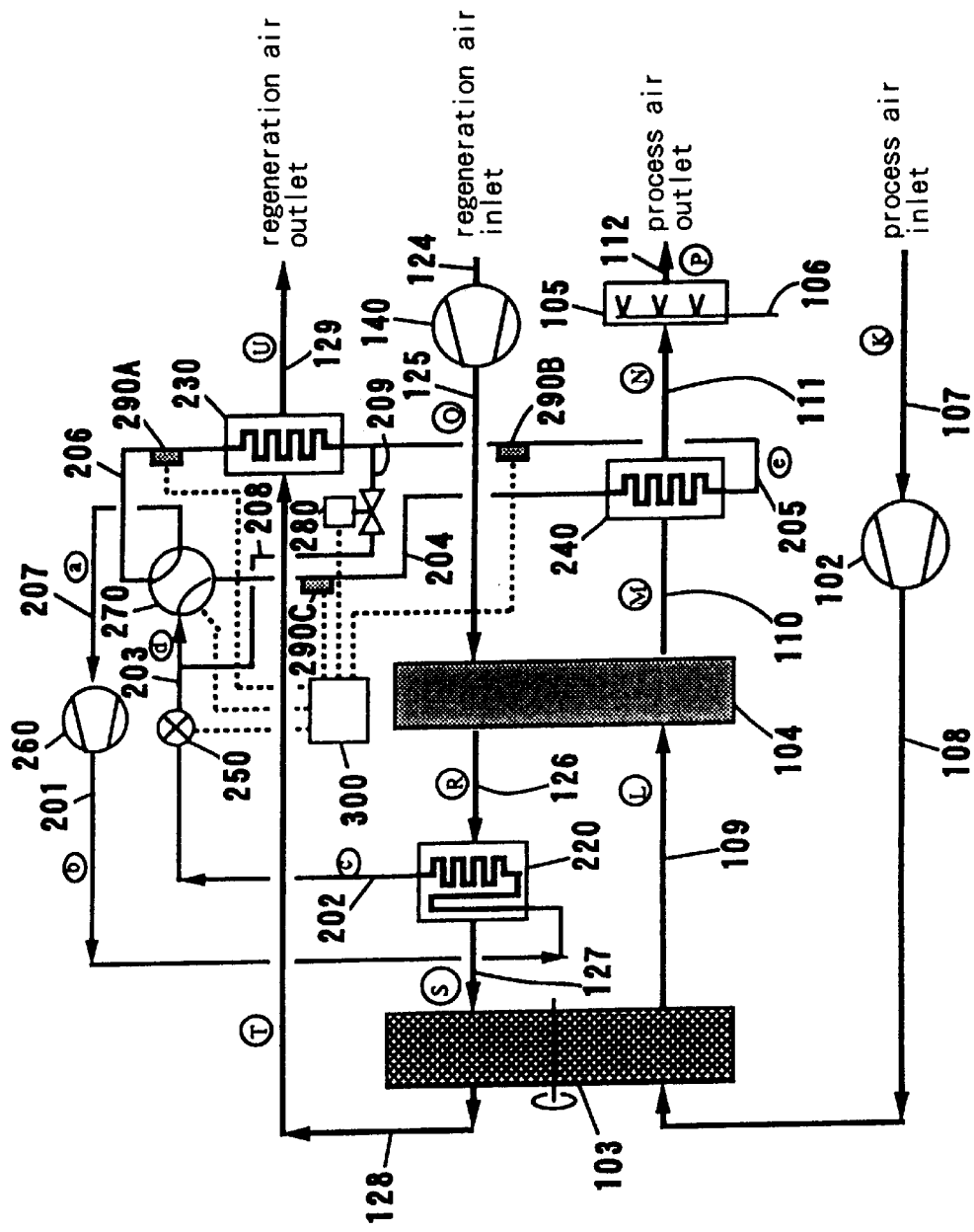
FIG. 6 is a diagram to explain the basic structure of a second embodiment of the air conditioning system.

FIG. 6 shows a second embodiment of this invention. This embodiment is similar to the first system, in which the vapor compression type refrigeration circuit of a heat pump 200 comprises: a compressor 260; a first low-temperature heat source heat exchanger (evaporator) 240; a second low-temperature heat source heat exchanger (evaporator) 230; a high-temperature heat source heat exchanger (condenser) 220; an expansion valve 250, and a four-way valve 270 is provided between a passage from the expansion valve 250 to the compressor 260 of the circuit, so that the four-way valve 270 can selectively switch the direction of the refrigerant flowing towards the inlet of the compressor 260 in such a way that the refrigerant exiting the expansion valve 250 passes from the four-way valve 270, to first low-temperature heat source heat exchanger (evaporator) 240, second low temperature heat source heat exchanger (evaporator) 230, and to a passage 207 to the inlet to the compressor via the other path of the four-way valve 270, or the refrigerant exiting the expansion valve 250 flows from the four-way valve 270, to second low-temperature heat source heat exchanger (evaporator) 230, first low-temperature heat source heat exchanger (condenser) 240, and to the passage 207 to the inlet of the compressor 260. The second system differs from the first system in that, there are bypass passages 208, 209, branching from the passage 203 connecting the expansion valve 250 and the four-way valve 270, and merging with the passage 205 connecting the first low-temperature heat source heat exchanger 240 and the second low-temperature heat source heat exchanger 230, and a valve 280 is provided in the bypass passages, and the expansion valve 250 is an electronic type expansion valve, so that the controller 300 can selectively detect a plurality of temperature sensors 290A, 290B, 290C, installed in respective passages 206, 205, 204 to regulate the opening of the valves; furthermore, the controller 300 provides various modes of operation, [cooling], [cooling assisted by dehumidifying], [dehumidifying assisted by cooling], [dehumidifying], [desiccant regeneration], and the four-way valve 270, sensors 290A~290C, degree of opening of valve 280, and the blower 102 are controlled as shown in the following Table 1.

TABLE 1

Operational Modes

| Operation Mode | 4-way valve position | Expansion valve sensor section | Valve 280 | Process air blower 102 |
|---|---|---|---|---|
| Cooling | 203 → 204 | 290B | Close | O-perate |
| Cool/dehumi | 203 → 204 | 290A | Open (adjust) | Operate |
| Dehumi/cool | 203 → 206 | 290C | Open (adjust) | Operate |
| Dehumi | 203 → 206 | 290C | Close | Operate |
| Desiccant regene | 203 → 206 | 290C | Close | Stop |

In other words, in the [cooling] mode, four-way valve 270 connects passage 203 with 204, and passage 206 with 207; temperature sensor 290B is used; valve 280 is fully closed; and the blower 102 is operated. In the [cooling assisted by dehumidifying] mode, four-way valve 270 connects passage 203 with 204 and passage 206 with 207; temperature sensor 290A is used; valve 280 is adjusted depending on the cooling load (sensible heat fraction) so that the degree of opening of the valve is higher for a low sensible heat fraction; and the blower 102 is operated. In the [dehumidifying assisted by cooling] mode, four-way valve 270 connects passage 203 with 206 and passage 204 with 207; temperature sensor 290C is used; valve 280 is adjusted depending on cooling load (sensible heat fraction) so that the degree of opening of the valve is higher for a higher sensible heat fraction; and the blower 102 is operated. In the [dehumidifying] mode, four-way valve 270 connects passage 203 with 206 and passage 204 with 207; temperature sensor 290C is used; valve 280 is fully closed; and the blower 102 is operated. In the [desiccant regeneration] mode, four-way valve 270 connects passage 203 with 206 and passage 204 with 207; temperature sensor 290C is used; valve 280 is fully closed; and the blower 102 is stopped.

In this case, the following heat transfer processes are the same as those in the first embodiment: a low-pressure refrigerant vapor exchanging heat with post-desiccant process air in the first low-temperature heat source heat exchanger (evaporator) 240; a low-pressure refrigerant vapor exchanging heat with post-desiccant regeneration air in the second low-temperature heat source heat exchanger (evaporator) 230; a high-pressure refrigerant vapor exchanging heat with pre-desiccant regeneration air in the high-temperature heat source heat exchanger (condenser) 220.

The construction of the air side system is the same as that in the first embodiment, so the explanations will be provided only for the operation of the various modes shown above. The [cooling] mode and [desiccant regeneration] mode are the same as in the first embodiment, and their explanations are omitted.

First, the [cooling assisted by dehumidifying] mode will be explained. This operational mode is used when the sensible heat fraction of the cooling load is low so that the [cooling] mode results in the conditioning space becoming too cold, therefore, in this mode, the sensible heat processing capability is lowered and the proportion of latent heat loading capability is increased.

The process of vapor compression cycle in the [cooling assisted by dehumidifying] mode of operation for the desiccant-assisted air conditioning system will be explained in the following. In this operational mode, the four-way valve 270 connects passage 203 with 204, and passage 206 with 207; the temperature sensor 290A is used to detect the temperature; valve 280 is adjusted depending on the thermal load (sensible heat fraction) so that when the sensible heat fraction is small, the degree of opening of the valve is large; and the blower 102 is operated. In this case, the refrigerant evaporates by consuming latent heat of evaporation in the first low-temperature heat source heat exchanger (evaporator) 240 from the process air dehumidified in the desiccant 103, and merges with unevaporated refrigerant flowing from the bypass path 209 in the passage 205, and again becomes a moist vapor to arrive at the second low-temperature heat source heat exchanger (evaporator) 230, and evaporates by exchanging heat with the high temperature regeneration air exiting from the desiccant wheel 103, and passes through the passage 206, four-way valve 270, passage 207 and is drawn into the compressor 260 to be compressed. Compressed refrigerant passes through the passage 201 and flows into the high-temperature heat source heat exchanger (condenser) 220, and releases sensible heat in the superheated vapor of the refrigerant and the latent heat of condensation to pre-desiccant regeneration air, and passes through the passage 202 and reaches the expansion valve 250, and reduces pressure by expanding, and passes through the four-way valve 270, passage 204 and flows back to the first low-temperature heat source heat exchanger (evaporator) 240. Accordingly, heat pump 200 recovers heat from the low-temperature heat source heat exchangers 230, 240 provided in the respective passages for process air and regeneration air, and releases the amount of heat equivalent to the recovered heat and compressive power in the high-temperature heat source heat exchanger (condenser) 220.

In this mode, the refrigerant evaporates in the second low-temperature heat source heat exchanger (evaporator) 230 also, therefore, the degree of superheating of refrigerant at the compressor inlet is not as severe as in the case of the [cooling] mode, and the degree of superheating after compression is also not too severe and the sensible heat that can be utilized in the high-temperature heat source heat exchanger (condenser) 220 is decreased, but the cooling load in the [cooling assisted by dehumidifying] mode is not as high as that in the [cooling] mode so that, in practice, the desiccant material can be regenerated without any problems.

Next, the operation of the desiccant-assisted air conditioning in the [cooling assisted by dehumidifying] mode will be explained with reference to the psychrometric chart shown in FIG. 7. Return air (process air: state K) admitted to the system passes through the passage 107 and is drawn into the blower 102, and is pressurized and sent, through the passage 108, to the first zone to perform moisture adsorption in the desiccant wheel 103, and moisture in the process air is adsorbed in the adsorbent in the desiccant wheel 103, and lowers its humidity ratio and increases its temperature due to heat of adsorption (state L). Process air that has been lowered in humidity and increased in temperature is sent to sensible heat exchanger 104, through the passage 109, and exchanges heat with outdoor air (regeneration air) and is cooled (state M). Cooled process air passes through the passage 110 and is cooled while passing through the first low-temperature heat source heat exchanger (evaporator) 240 (state N), but the degree of cooling is less than that in the [cooling] mode, because the refrigerant bypasses the first low-temperature heat source heat exchanger (evaporator) 240, and the cooling capability is reduced by a corresponding amount, and the dry bulb temperature is maintained at a high level. Also, although the cooled process air is sent to the humidifier 105, but because the purpose of this mode of operation is dehumidification, the humidifier 105 is stopped (state P=N) to prevent the conditioning space becoming too cold, and it is returned, through the passage 112, as supply air to the conditioning space while keeping the humidity ratio difference DX between the conditioning space.

On the other hand, regeneration of the desiccant wheel 103 is carried out as follows. Outdoor air (state Q), used as regeneration air, passes through the passage 124, and is drawn into the blower 140, and is pressurized and sent to the sensible heat exchanger 104, and cools the process air while raising its temperature (state R), and reaches the high-temperature heat source heat exchanger (condenser) 220, through the passage 126, and is heated by the refrigerant vapor to increase its temperature (state S). Process air exiting from the high-temperature heat source heat exchanger (condenser) 220 passes through the second zone to perform regeneration of desiccant wheel 103, and desorbs moisture from the desiccant wheel 103 (state T), and is sent to the second low-temperature heat source heat exchanger (evaporator) 230, through the passage 128, and heats the refrigerant vapor thereby lowering own temperature (state U), and is discarded outside as spent air through the passage 129.

Accordingly, the desiccant-assisted air conditioning system repeats the processes of desiccant regeneration and dehumidifying of the process air, but in this embodiment, the heat recovered from the process air in the first low-temperature heat source heat exchanger (evaporator) 240 and the heat recovered from the regeneration air in the second low-temperature heat source heat exchanger (evaporator) 230 are both released in the high-temperature heat source heat exchanger (condenser) 220, and therefore, sensible heat load in the air conditioning load is reduced, so that even though the amount of heat recoverable in the first low-temperature heat source heat exchanger (evaporator) 240 is decreased (process M--N), this loss can be supplemented by the second low-temperature heat source heat exchanger (evaporator) 230 to perform regeneration of the desiccant material.

Next, the process of cooling in this system according to the [dehumidifying] mode of operation for the desiccant-assisted air conditioning system will be explained in the following. This operational mode is used when the sensible heat fraction of the cooling load is low so that the [cooling assisted by dehumidifying] mode or the [humidifying assisted by cooling] mode to be described later results in the conditioning space becoming too cold, therefore, in this mode, the sensible heat processing capability is further lowered and the latent heat load is processed.

The process of vapor compression refrigeration cycle in the [dehumidifying] mode of operation for the desiccant-assisted air conditioning system will be explained in the following. The four-way valve 270 operates to connect passage 203 with 206, and passage 204 with 207; the temperature sensor 290C is used to detect the temperature; valve 280 is completely closed; and the blower 102 is operated. In this case, the refrigerant evaporates by consuming latent heat of evaporation in the second low-temperature heat source heat exchanger (evaporator) 230 from the post-desiccant regeneration air, and arrives at the first low-temperature heat source heat exchanger 240, through the passage 205, and exchanges heat with the process air, and passes through the passage 204, four-way valve 270, passage 207 and is drawn into the compressor 260 and is compressed. Compressed refrigerant passes through the passage 201 and flows into the high-temperature heat source heat exchanger (condenser) 220, and releases sensible heat of the superheated refrigerant vapor and the latent heat of condensation to pre-desiccant regeneration air, and passes through the passage 202 and arrives in the expansion valve 250, where it expands and reduces pressure, and passes through the four-way valve 270 and the passage 206, and flows back to the second low-temperature heat source heat exchanger (evaporator) 230. Accordingly, in this mode, heat is exchanged with the process air in the first low-temperature heat source heat exchanger 240, and although the vapor may possibly condense due to temperature difference, because the degree of superheating in the refrigerant flowing into the compressor is adjusted in the temperature sensor section 290C disposed at the outlet of the first low-temperature heat source heat exchanger 240, if the degree of superheat in the temperature sensor section 290C decreases due to re-condensation, by closing the expansion valve 250 the suction pressure can be decreased, and the saturation temperature of the refrigerant is lowered and condensation is stopped so that formation of liquid back flow in the compressor 260 can be avoided.

Next, the operation of the system in the [dehumidifying] mode will be explained. Return air (process air: state K) admitted to the system passes through the passage 107 and is drawn into the blower 102, and is pressurized and sent, through the passage 108, to the first zone to perform moisture adsorption in the desiccant wheel 103, where moisture in the process air is adsorbed in the adsorbent in the desiccant wheel 103, and lowers its humidity ratio and increases its temperature due to heat of adsorption. Dehumidified process air whose temperature has been increased is sent to sensible heat exchanger 104, through the passage 109, and exchanges heat with outdoor air (regeneration air) and is cooled (state M). Cooled process air passes through the passage 110 and passes through the first low-temperature heat source heat exchanger (evaporator) 240, but because only a dry vapor of the refrigerant produced in the second low-temperature heat source heat exchanger (evaporator) 230 is flowing in the first low-temperature heat source heat exchanger (evaporator) 240, it passes therethrough with little heat transfer. Process air exiting the first low-temperature heat source heat exchanger (evaporator) 240 is sent to the humidifier 105 but the purpose of this mode of operation is to dehumidify the air so that the humidifier is stopped to prevent excessive cooling in the conditioning space, and the process air is returned to the conditioning space as a supply air as it is, while keeping the humidity ratio difference DX through the passage 112.

On the other hand, regeneration of the desiccant wheel 103 is carried out as follows. Outdoor air (state Q), used as regeneration air, passes through the passage 124, and is drawn into the blower 140, and is pressurized and sent to the sensible heat exchanger 104, and cools the process air while raising its temperature, and reaches the high-temperature heat source heat exchanger (condenser) 220, through the passage 126, and is heated by the refrigerant vapor, thus raising its temperature (state S). Process air exiting from the high-temperature heat source heat exchanger (condenser) 220 passes through the second zone to perform regeneration of desiccant wheel 103, and removes moisture from the desiccant wheel 103, and is sent to the second low-temperature heat source heat exchanger (evaporator) 230, through the passage 128, and heats the refrigerant vapor thereby lowering its temperature, and is discarded outside as spent air through the passage 129.

Accordingly, the desiccant-assisted air conditioning system repeats the processes of desiccant regeneration and dehumidifying of the process air, but in this embodiment, the heat recovered from the process air in the second low-temperature heat source heat exchanger (evaporator) 230 is released in the high-temperature heat source heat exchanger (condenser) 220, and therefore, sensible heat load portion of the air conditioning load is lowered, so that even though the amount of heat recoverable in the first low-temperature heat source heat exchanger (evaporator) 240 is eliminated, this loss can be supplemented by the second low-temperature heat source heat exchanger (evaporator) 230 to perform regeneration of the desiccant material.

Next, the [dehumidifying assisted by cooling] mode will be explained. This operational mode is used when the sensible heat fraction of the cooling load is low so that the [cooling assisted by dehumidifying] mode results in the conditioning space becoming too cold, therefore, in this mode, the sensible heat processing capability is further lowered and the latent heat load is processed.

The process of vapor compression cycle in the [dehumidifying assisted by cooling] mode of operation for the desiccant-assisted air conditioning system will be explained in the following. In this operational mode, the four-way valve 270 operates to connect passage 203 with 206, and passage 204 with 207; the temperature sensor 290C is used to detect the temperature; valve 280 is adjusted depending on the thermal load (sensible heat fraction) so that when the sensible heat fraction is high, the degree of opening of the valve is large; and the blower 102 is operated. In this case, the refrigerant evaporates by consuming latent heat of evaporation in the second low-temperature heat source heat exchanger (evaporator) 230 from the post-desiccant regeneration air, and merges with unevaporated refrigerant flowing from the bypass path 209 in the passage 205, and again becomes moist vapor to arrive at the first low-temperature heat source heat exchanger (evaporator) 240, and exchanges heat with the process air and evaporates, and passes through the passage 204, four-way valve 270, passage 207 and is drawn into the blower 260 and is compressed. Compressed refrigerant passes through the passage 201 and flows into the high-temperature heat source heat exchanger (condenser) 220, and releases sensible heat in the superheated vapor of the refrigerant and the latent heat of condensation to pre-desiccant regeneration air, and passes through the passage 202 to arrive at the expansion valve 250, where it expands and reduces pressure, and passes through the four-way valve 270, passage 206, and flows back to the second low-temperature heat source heat exchanger (evaporator) 230. Accordingly, heat pump 200 recovers heat from the low-temperature heat source heat exchangers 230, 240 provided in the respective zones for the process air and the regeneration air, and releases the amount of heat equivalent to the recovered heat and compressive power in the high-temperature heat source heat exchanger (condenser) 220. In this mode, similar to the [cooling assisted by dehumidifying] mode of operation, the degree of superheating of refrigerant at the compressor inlet is not as severe as in the case of [cooling] mode, therefore, the degree of superheating after compression is also not too severe and the sensible heat that can be utilized in the high-temperature heat source heat exchanger (condenser) 220 is decreased, but the cooling load in the [dehumidifying assisted by cooling] mode is not as high as that in the [cooling] mode so that the desiccant material can be regenerated without any problems in practice.

Figure 7:
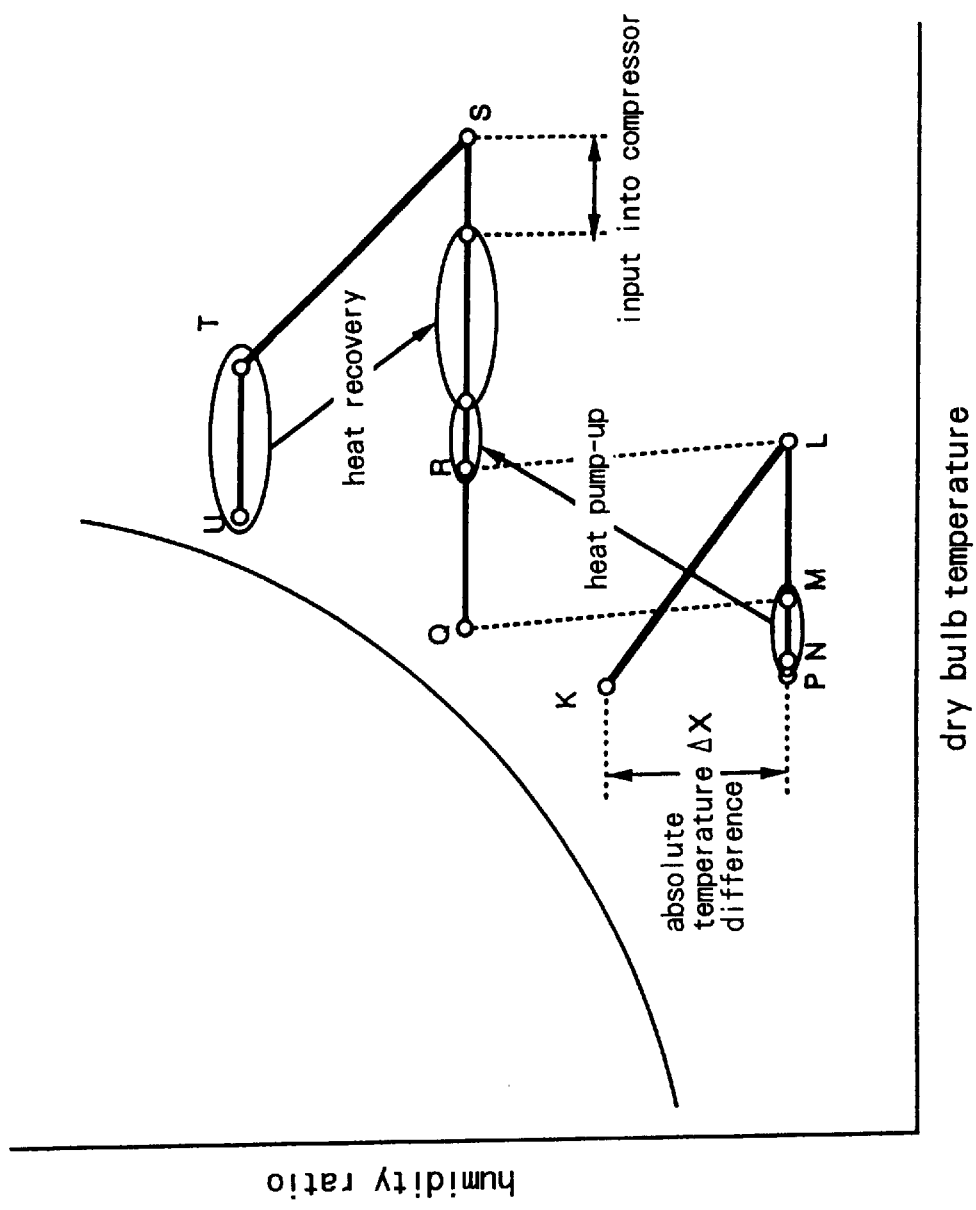
FIG. 7 is a psychrometric chart showing the operation of "cooling assisted by dehumidifying" mode of cooling in the embodiment shown in FIG. 6.
Figure 8:
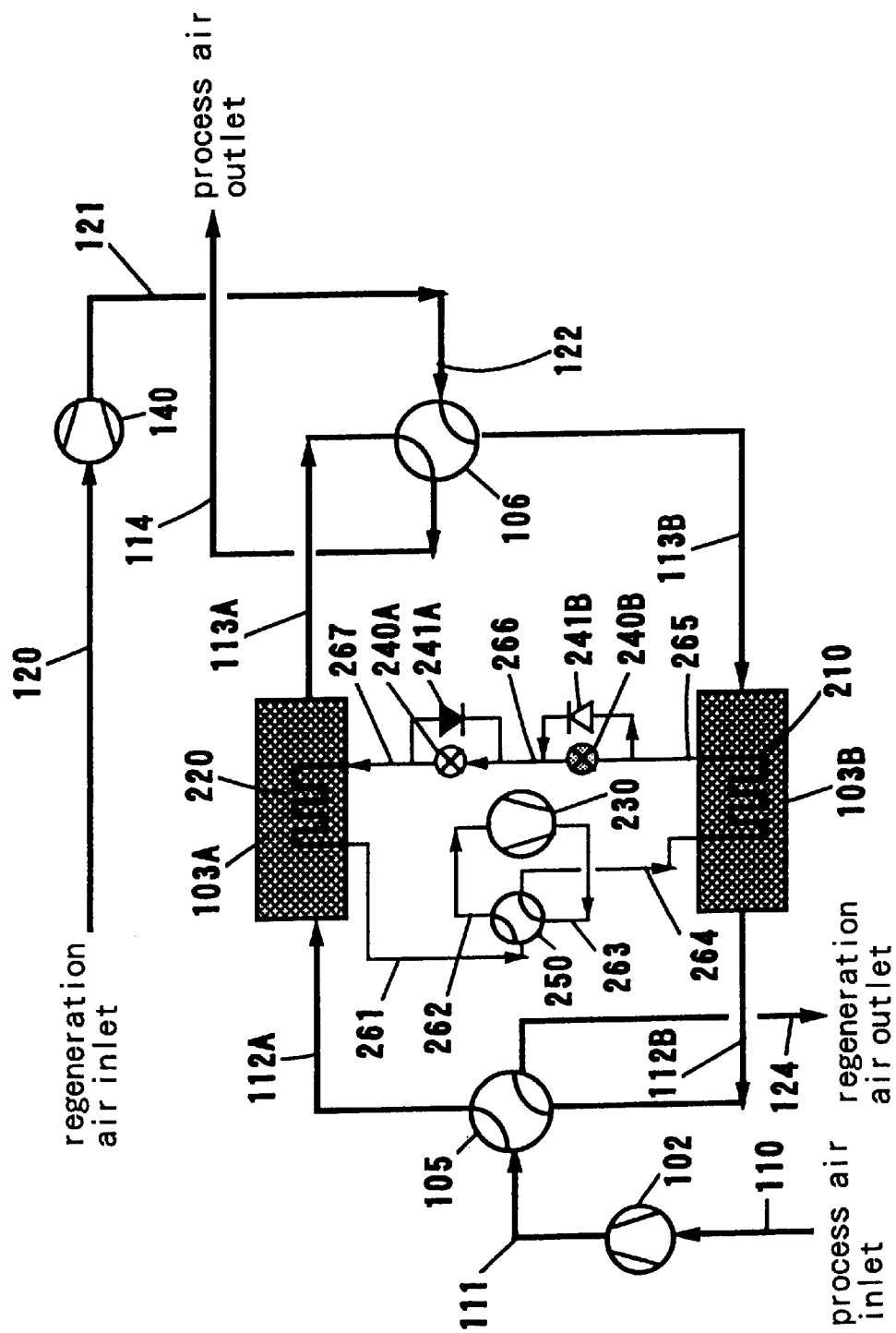
FIG. 8 is a diagram to explain the basic structure of the conventional desiccant-assisted air conditioning system.

The operation of the system in the [dehumidifying assisted by cooling] mode can be explained using the psychrometric chart shown in FIG. 7 for [cooling assisted by dehumidifying] mode of operation, therefore, explanation will be omitted. It should be mentioned, however, that because the primary low-temperature heat source used to recover heat in this mode is the second low-temperature heat source heat exchanger 230, and this is the first place the refrigerant exiting the expansion valve 250 so that heat recovery from the regeneration air is high, and therefore, this system is more suitable than the [cooling assisted by dehumidifying] mode, when the sensible heat fraction is very low.

Accordingly, in this embodiment, [cooling], [cooling assisted by dehumidifying], [dehumidifying assisted by cooling], and [dehumidifying] modes of operation are provided to meet a variety of air conditioning loads and sensible heat fractions. It should be noted that, although the valve 280 in the bypass passages 208, 209 is branched from the passage connecting the expansion valve 250 and the four-way valve 270, but when the valve opening of the valve 280 is controlled according to the electronic expansion valve 250, the bypass passage may be branched from the passage 202 between the condenser outlet and the expansion valve 250.

As explained above, this invention enables the refrigerant flowing into the compressor in a heat pump disposed in an air conditioning system, in which the process of moisture adsorption by the desiccant material and the process of regeneration of desiccant by heat pump are carried out continuously, is heated with regeneration air after it has removed moisture from a desiccant material, in order to raise the temperature, that is, increase in the enthalpy of superheated compressed refrigerant vapor, thereby increasing the sensible heat fraction in the released heat in the high-temperature heat source of the heat pump, thereby raising desiccant regeneration temperature so as to increase the regeneration capability of the desiccant material; and at the same time; by placing a low-temperature heat source of the heat pump in each passage for process air and regeneration air, and switching the flow direction of the refrigerant flowing into the compressor, heat can be gained from both process air and regeneration air for use in regeneration of the desiccant material so as to permit regeneration operation of desiccant individually, and further permitting operation of the system based primarily on dehumidifying the process air when the sensible heat fraction is small, thereby providing an air conditioning system and method of operation to produce superior performance in dehumidification and starting properties as well as flexible conditioning mode to fit the surrounding conditions to result in energy saving.

INDUSTRIAL APPLICABILITY

This invention can be used as an air conditioning system in normal dwellings or in large buildings such as supermarkets and offices, for example.

What is claimed is:

1. An air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating said desiccant; wherein a refrigerant flowing into said compressor of said heat pump is heated with post-desiccant regeneration air that has regenerated said desiccant, thereby raising the temperature of said refrigerant after compression, which then exchanges heat with pre-desiccant regeneration air before it regenerates said desiccant.

2. An air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating said desiccant; wherein a low-temperature heat source of said heat pump is comprised by at least two heat exchangers, and wherein a first low-temperature heat source heat exchanger exchanges heat with process air flowing in a downstream side of a desiccant, and a second low-temperature heat source heat exchanger exchanges heat with regeneration air flowing in a downstream side of said desiccant, and a refrigerant is made to flow into said compressor by selecting either a forward path from said first low-temperature heat source heat exchanger to said second low-temperature heat source heat exchanger or a reverse path from said second low-temperature heat source heat exchanger to said first low-temperature heat source heat exchanger.

3. An air conditioning system comprising: a desiccant for adsorbing moisture for process air; and a heat pump, including a compressor, that operates by using process air as a low-temperature heat source and regeneration air as a high-temperature heat source so as to supply heat to regeneration air for regenerating said desiccant; wherein paths of process air and regeneration air that pass through said desiccant are divided into a first zone for performing dehumidifying of process air and a second zone for performing regeneration of said desiccant using regeneration air so that said desiccant repeatedly shifts its position between said first zone and said second zone, and said heat pump is comprised by at least a compressor and a first low-temperature heat source heat exchanger, a second low-temperature heat source heat exchanger and a high-temperature heat source heat exchanger, and process air is made to pass through said desiccant in said first zone, said first low-temperature heat source heat exchanger of said heat pump, and then to enter a conditioning space, and said regeneration air is made to pass through said high-temperature heat source heat exchanger of said heat pump, said desiccant in said second zone and said second low-temperature heat source heat exchanger of said heat pump before being discharged outside, and a refrigerant is made to flow into said compressor by selecting either a forward path from said first low-temperature heat source heat exchanger to said second low-temperature heat source heat exchanger or a reverse path from said second low-temperature heat source heat exchanger to said first low-temperature heat source heat exchanger.

4. An air conditioning system according to claim 3, wherein said desiccant has a wheel shape so that, by rotating said desiccant, it repeatedly shifts its position between said first zone and said second zone.

5. An air conditioning system according to any one of claims 1 to 4, wherein, by selecting a path for a refrigerant to flow from said first low-temperature heat source heat exchanger to said second low-temperature heat source heat exchanger and into said compressor, said refrigerant flowing into said compressor is heated by post-desiccant regeneration air that has regenerated said desiccant so as to raise the temperature of compressed refrigerant before allowing transfer of heat with pre-desiccant regeneration air in said high-temperature heat source heat exchanger.

6. An air conditioning system according to any one of claims 2 to 4, wherein, by selecting a path for a refrigerant to flow from said second low-temperature heat source heat exchanger to said first low-temperature heat source heat exchanger and into said compressor, heat recovered from post-desiccant regeneration air is used to heat pre-desiccant regeneration air.

7. A method for operating an air conditioning system disclosed in any one of claims 2 to 4, including the steps of: flowing regeneration air; stopping process air flow; selecting a path for a refrigerant to flow from said second low-temperature heat source heat exchanger to said first low-temperature heat source heat exchanger and into said compressor, and heat recovered from post-desiccant regeneration air is used to regenerate said desiccant before startup of said system.

8. An air conditioning system according to any one of claims 2 to 4, wherein a four-way valve is chosen as means for selecting a path of a refrigerant to flow from said first low-temperature heat source heat exchanger to said second low-temperature heat source heat exchanger and into said compressor, or from said second low-temperature heat source heat exchanger to said first low-temperature heat source heat exchanger and into said compressor, said four-way valve can select a path of connecting an expansion valve with either said first low-temperature heat source heat exchanger or said second low-temperature heat source heat exchanger, and also can select a path of connecting either said second low-temperature heat source heat exchanger or said first low-temperature heat source heat exchanger to said compressor, said air conditioning system further comprising a bypass passage having a bypass valve and branching from a passage joining said high-temperature heat source heat exchanger to said four-way valve through said expansion valve, and merging with a passage connecting said first low-temperature heat source heat exchanger and said second low-temperature heat source heat exchanger, and wherein, when heating pre-desiccant regeneration air by receiving heat produced by operating said first low-temperature heat source heat exchanger and said second low-temperature heat source heat exchanger, a degree of opening of said bypass valve is adjusted so as to flow unevaporated refrigerant to a passage connecting said first low-temperature heat source heat exchanger and said second low-temperature heat source heat exchanger.

9. A method for operating an air conditioning system according to any one of claims 6 to 8 for performing primarily dehumidifying air by lowering a sensible heat fraction in said air conditioning system.

\* \* \* \* \*